United States Patent [19]

McCrill

[11] Patent Number: 5,103,625
[45] Date of Patent: Apr. 14, 1992

[54] APPARATUS FOR COOLING SHAKER HEADS

[75] Inventor: Kenneth L. McCrill, Sutter, Calif.

[73] Assignee: Orchard Machinery Corporation, Yuba City, Calif.

[21] Appl. No.: 612,242

[22] Filed: Nov. 7, 1990

[51] Int. Cl.⁵ .......................................... A01D 46/00
[52] U.S. Cl. ........................................... 56/340.1
[58] Field of Search ............ 56/340.1, 328.1, DIG. 9, 56/DIG. 10

[56] References Cited

U.S. PATENT DOCUMENTS 4,893,458  1/1990  Compton ........................... 56/340.1
4,893,459  1/1990  Orlando ............................. 56/340.1

Primary Examiner—Thuy M. Bui
Attorney, Agent, or Firm—Rosenblum, Parish & Bacigalupi

[57] ABSTRACT

An apparatus for cooling shaker heads including an air cooling system wherein coolant air is blown upon the drive belts, sling surfaces and through the interior of the pillow pads. Also includes is a water cooling system in which coolant water is sprayed upon the outer surfaces of the slings. The coolant water may contain a fungicide which inhibits the spread of fungus diseases from tree to tree through contact with the slings.

13 Claims, 6 Drawing Sheets

APPARATUS FOR COOLING SHAKER HEADS

BACKGROUND OF THE INVENTION

1. Field of the Invention

The present invention relates generally to shaker heads that are mounted upon mechanized harvesting vehicles and utilized to shake fruit and nut trees, and more particularly to an apparatus for the air and/or liquid cooling of such shaker heads during tree shaking operations.

2. Brief Description of the Prior Art

Devices for shaking nut and fruit trees to cause nuts or fruit to drop to the ground for harvesting are well known in the prior art. R. W. Brandt, Jr., was a particularly prolific inventor in this field, and his U.S. Pat. No. 3,163,458 issued Dec. 29, 1964; U.S. Pat. No. 3,220,268 issued Nov. 30, 1965; U.S. Pat. No. 3,221,567 issued Dec. 7, 1965; and U.S. Pat. No. 3,318,629 issued May 9, 1967 describe various features of tree shaking devices and shaker heads that are still employed in current devices. A problem with current shaker heads is frictional heat buildup within the shaker heads. Such heat buildup necessitates the frequent rotation of pillow pads mounted upon the shaker heads and shortens the life of the pillow pads and the slings that hold the pillow pads to the shaker head. However, none of R. W. Brandt, Jr.'s devices include shaker head cooling mechanisms to alleviate heat buildup in the shaker head and pillow pads.

U.S. Pat. No. 4,893,458, issued Jan. 16, 1990 to Ira Compton, teaches a liquid-cooled shaker head retaining sling. In this device each sling is provided with a pattern of coolant channels through which cooling liquid is pumped, thus cooling the sling and helping to prevent heat buildup in the pillow pad.

SUMMARY OF THE INVENTION

It is an object of the present invention to provide a cooling apparatus for shaker heads to prolong the life of shaker head components.

It is another object of the present invention to provide an apparatus for cooling the drive belt and vibration mechanism of a shaker head, to prolong the life of these components.

It is a further object of the present invention to provide an apparatus for cooling the surface of the slings of a shaker head, to reduce heat buildup and prolong the life of the slings.

It is yet another object of the present invention to provide an apparatus for cooling the pillow pads of a shaker head, to reduce heat buildup within the pillow pads and reduce the necessity for rotation of pillow pads, and to prolong the life of the pillow pads.

It is yet a further object of the present invention to provide an apparatus for the liquid cooling of the slings of a shaker head by spraying liquid on the surface thereof, to reduce heat buildup within the slings and prolong the life of the slings.

The present invention is an apparatus for cooling the shaker head mechanism and pillow pads of a tree shaking device. In a preferred embodiment, pressurized cooling air is pumped through the pillow pads to dissipate heat. Additionally, pressurized coolant air is blown upon the drive belt and vibration mechanism to dissipate heat. Coolant air is also blown upon the outer surface of the sling for heat dissipation purposes. In an alternative embodiment, coolant water is sprayed upon the outer surface of the slings to further prevent heat buildup within the slings and pillow pads.

It is an advantage of the present invention that it provides a cooling apparatus for shaker heads to prolong the life of shaker head components.

It is another advantage of the present invention that it provides an apparatus for cooling the drive belt and vibration mechanism of a shaker head, to prolong the life of these components.

It is a further advantage of the present invention that it provides an apparatus for cooling the surface of the slings of a shaker head, to reduce heat buildup and prolong the life of the slings.

It is yet another advantage of the present invention that it provides an apparatus for cooling the pillow pads of a shaker head, to reduce heat buildup within the pillow pads and reduce the necessity for rotation of pillow pads, and to prolong the life of the pillow pads.

It is yet a further advantage of the present invention that it provides an apparatus for the liquid cooling of the slings of a shaker head by spraying liquid on the surface thereof, to reduce heat buildup within the slings and prolong the life of the slings.

The foregoing and other objects, features, and advantages of the present invention will become apparent from the following detailed description of the preferred embodiments which make reference to the several figures of the drawing.

IN THE DRAWING

DETAILED DESCRIPTION OF THE PREFERRED EMBODIMENT

Figure 1:
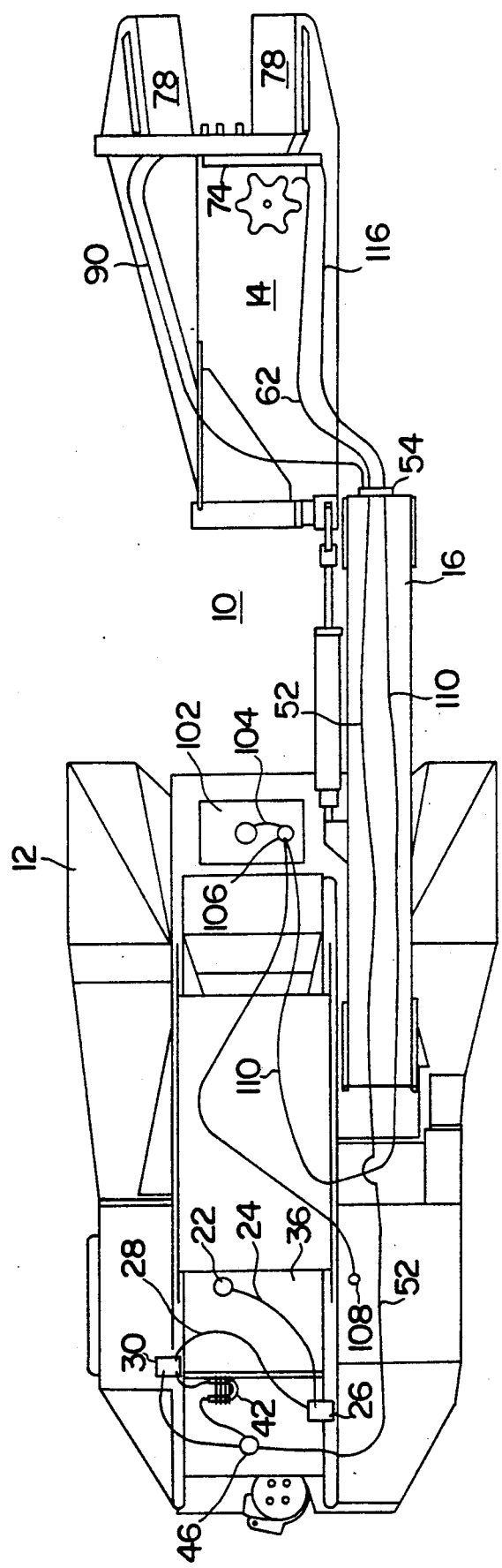
FIG. 1 is a top plan view of a harvesting vehicle having a shaker head mounted on a mechanical arm.

FIG. 1 is a top plan view depicting a harvesting vehicle 12 having a shaker head 14 mounted upon an arm 16. The shaker head cooling systems 10 of the present invention generally include pumps and hardware mounted on the vehicle 12 with feed lines that supply air and water coolants to various components of the shaker head that are subject to overheating. In the preferred embodiment of the present invention, both an air cooling system and a water cooling system are utilized to achieve the desired cooling of shaker head components. The air cooling system 20 is first described with the aid of FIGS. 2, 3, 4 and 5.

Figure 2:
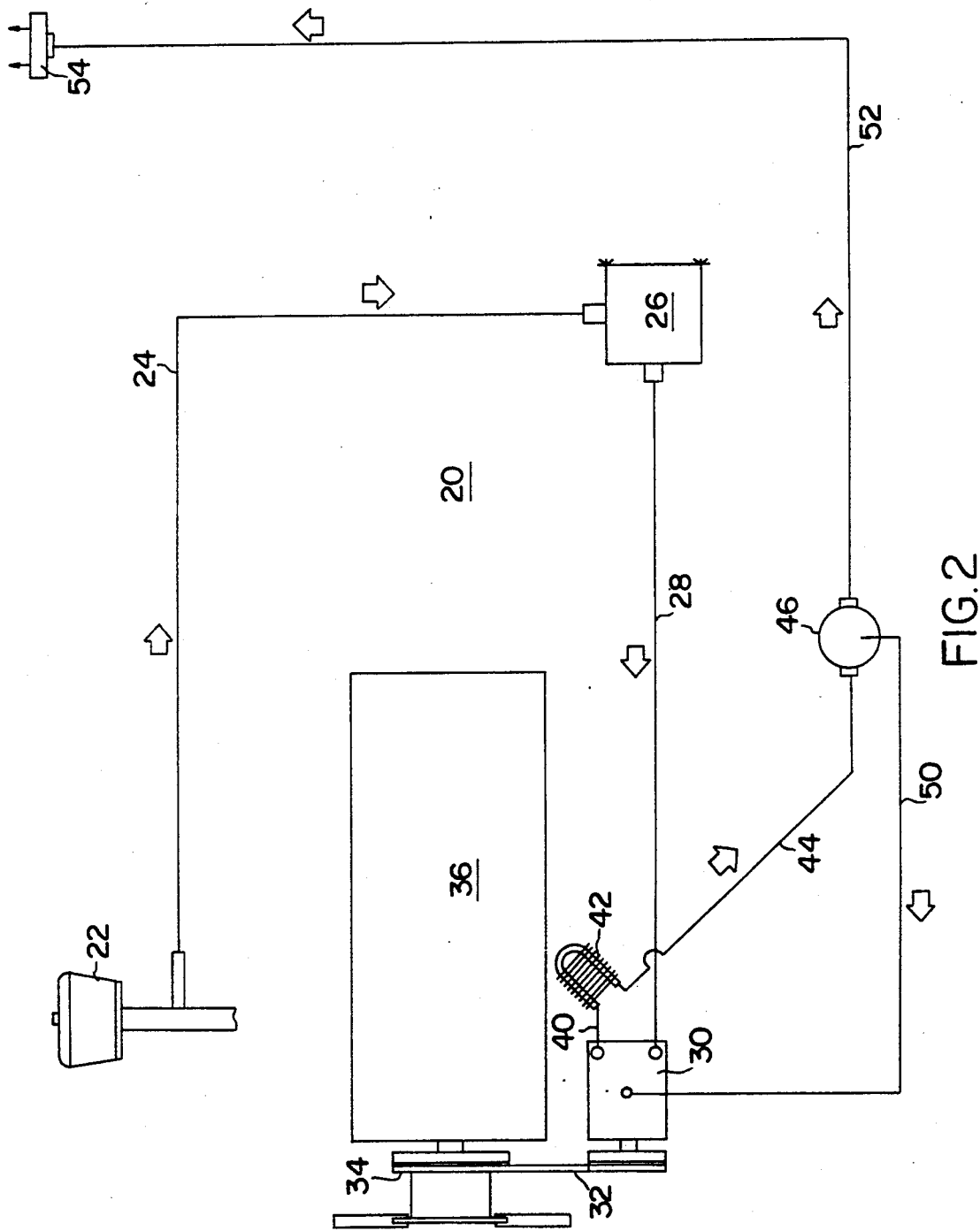
FIG. 2 is a schematic diagram of the air cooling system of the present invention.
Figure 3:
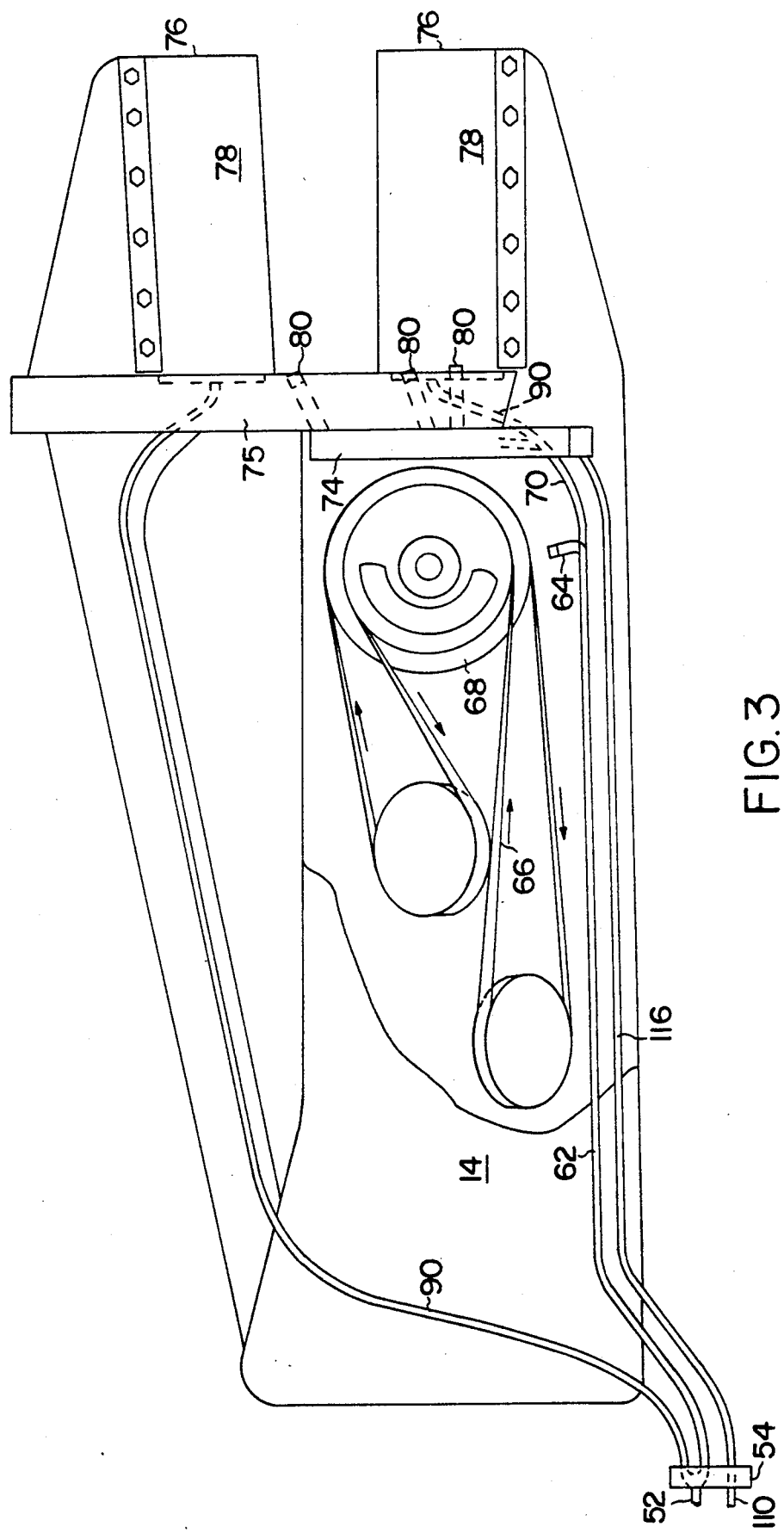
FIG. 3 is a top plan view, with cutaway portions of a shaker head of the present invention.
Figure 4:
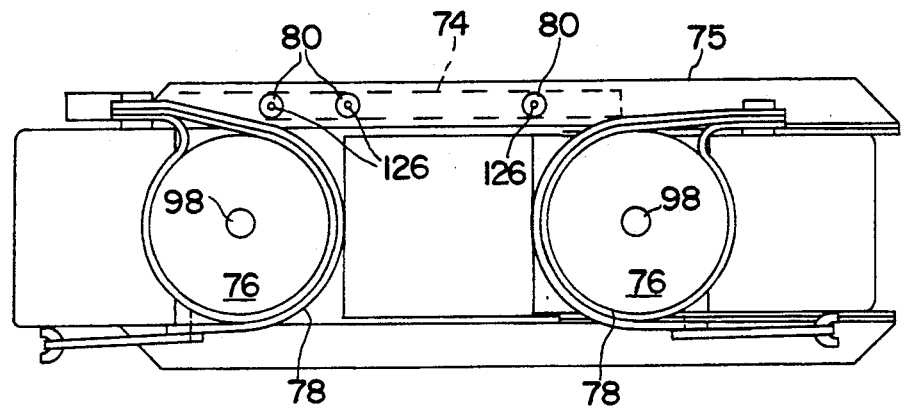
FIG. 4 is an end elevational view of the shaker head depicted in FIG. 3.
Figure 6:
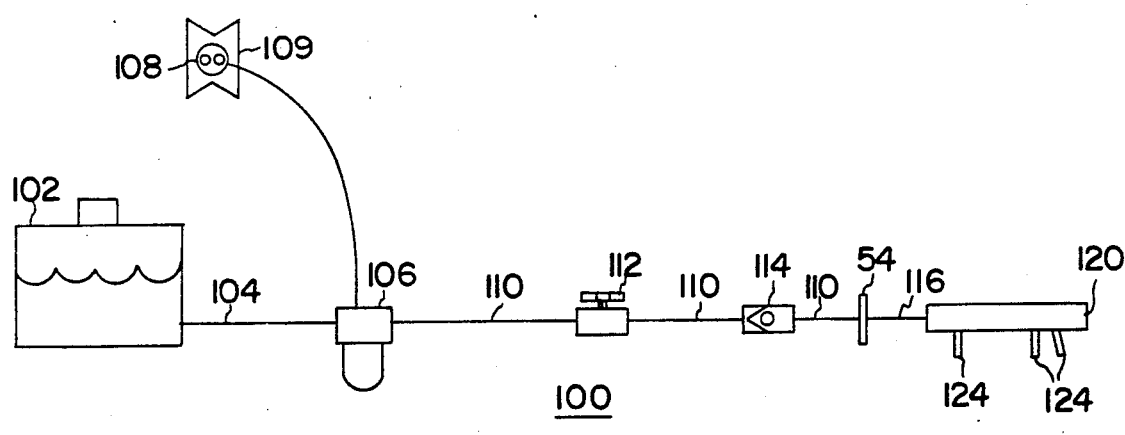
FIG. 6 is a schematic diagram of the liquid cooling system of the present invention.
Figure 5:
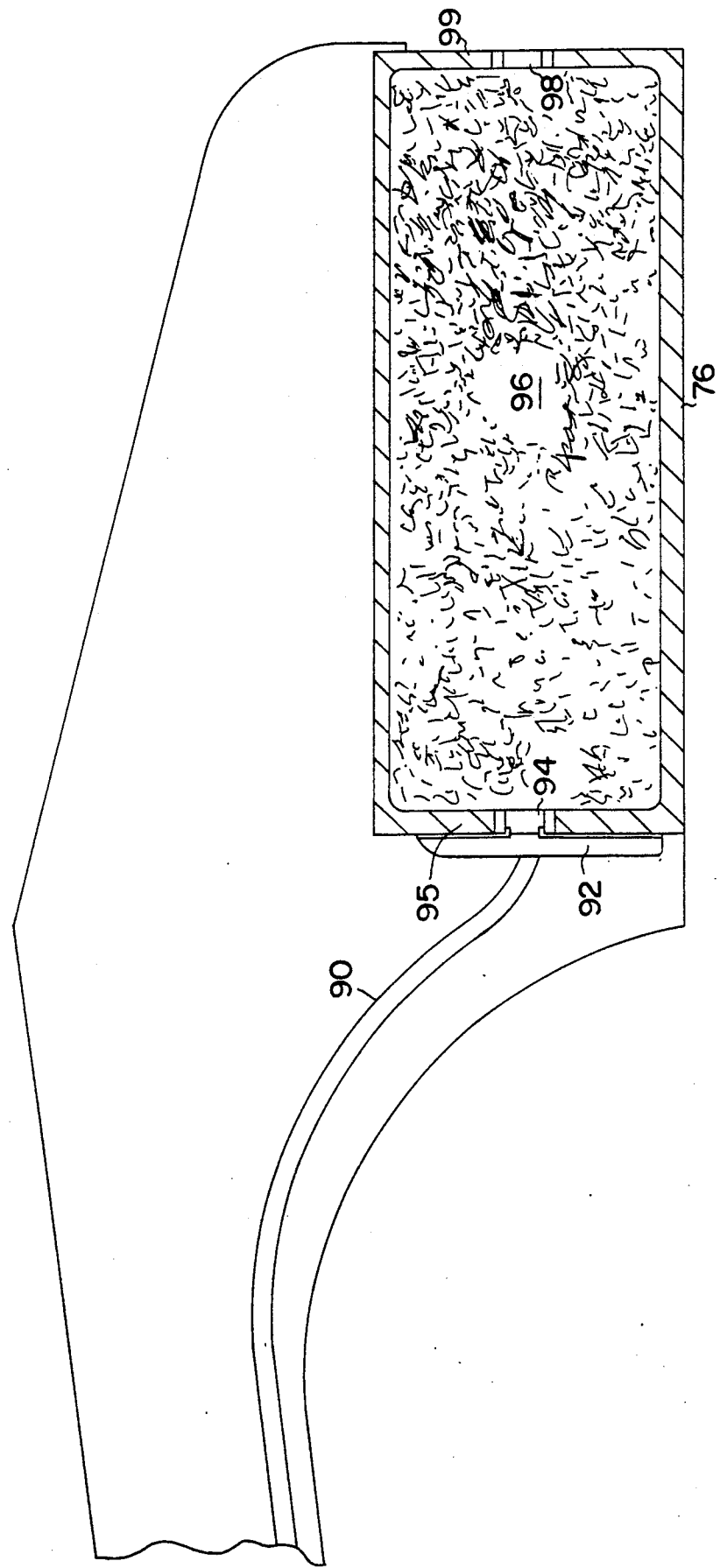
FIG. 5 is a top plan view, with cutaway portions, of the clamp arm of the shaker head depicted in FIGS. 3 and 4.

FIG. 2 is a schematic diagram of the portion of the air cooling system mounted upon the harvesting vehicle 12; FIG. 3 is a top plan view, with cutaway sections, of the shaker head of the present invention; FIG. 4 is an end elevational view of the shaker head depicted in FIG. 3; and FIG. 5 is a top plan view, with cutaway sections, of the clamp arm of the present invention. As depicted in FIGS. 1 and 2, the air cooling system 20 includes an air precleaner 22 into which air is taken into the system from the ambient. The air then passes through air lines 24 to an air filter 26 to remove any remaining foreign matter within the incoming air. In the preferred embodiment, a dual element air filter is utilized for this purpose. The air then passes through line 28 to an air compressor 30 which is powered by a fan belt 32 that is operated by a pulley 34 from the harvesting vehicle's engine 36. In the preferred embodiment, pressurized air is exhausted from the compressor 30 through air line 40, through a heat exchanger 42 and through air line 44 to an oil separator 46. The oil separator is utilized in the preferred embodiment to remove any oil vapors and particulates that may have entered the air during its passage through the air compressor. An oil drain line 50 is utilized to return any such oil to the air compressor 30. An air line 52 then feeds the pressurized air to a bulkhead 54 disposed at the end of the arm 16.

As is next seen in FIG. 3, air lines from the bulkhead 54 direct the pressurized air to particularized locations within the shaker head 14. Specifically, an air line 62, having an air nozzle 64 engaged thereto, directs pressurized air to the drive belt 66 and eccentric shaking wheels 68 of the shaker head 14. It has been found that a substantial heat buildup occurs within the shaking mechanism, including the belt 66 and vibration wheels 68 during standard operations, and this heat buildup substantially shortens the life of the belt 66 and causes premature deterioration of the shaker head components 14. The coolant air from the nozzle 64 serves to substantially reduce the excessive heat buildup and results in prolonged life to the belt 66 and to the components of the shaker head 14.

The air line 62 is also extended 70 to an air manifold 74 that is engaged to a shaker head frame member 75 proximate the inner ends of the pillow pads 76 and slings 78 of the shaker head. A plurality of air nozzles 80, three of which are shown in FIGS. 3 and 4, are engaged to the air manifold 74 and project outwardly through the shaker head frame member 75. The nozzles 80 are disposed to direct coolant air upon the sling surfaces during tree shaking operations to help dissipate frictional heat buildup which occurs in the slings 78 during tree shaking operations.

In the preferred embodiment, coolant air is also directed into and through the pillow pads 76 to aid in the cooling of the pillow pads 76. As is seen with the aid of FIGS. 1, 3, 4 and 5, air lines 90 are disposed within the shaker head 14 to direct coolant air to the pillow pads 76. As seen in FIG. 5, the air from air line 90 is fed into a pressurized chamber 92 from which it is directed through a vented intake valve 94 formed in the inward end 95 of the pillow pad 76. The air then generally circulates through the granular material 96 disposed within the pillow pad 76, and exits through a vented exhaust valve 98 disposed at the outward end 99 of the pillow pad 76. The pressurized chamber 92 facilitates the removal and replacement of pillow pad 76 without the necessity of complicated air line hookup problems. The vented intake valve 94 and exhaust valve 98 serve to permit the air to enter and leave the pillow pad 76 without allowing the granular material 96 to escape from the pillow pad 76. The utilization of coolant air through the pillow pad 76 serves to dissipate heat buildup within the pillow pad, thereby increasing the time duration that a particular pillow pad may be utilized without the necessity for rotating the pillow pad or removing and replacing the pillow pad to allow it to cool down. The coolant air thus prolongs the life of particular pillow pads, and speeds up harvesting operations in that the operator does not have to stop as often to rotate and/or change pillow pads due to heat buildup.

Figure 7:
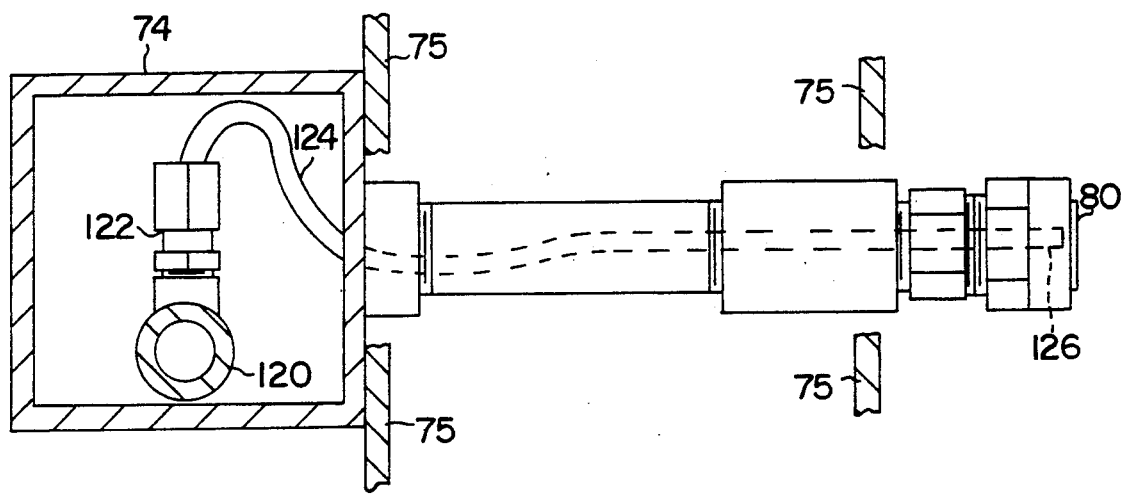
FIG. 7 is a partial cross-sectional view of the air manifold and water manifold of the present invention.

The water cooling system of the present invention is best described with the aid of FIGS. 1, 3, 6 and 7. The water cooling system 100 includes a water supply tank 102 that is mounted upon the harvesting vehicle 12. A water line 104 feeds the water from the tank 102 to a water pump 106 which pumps the water through the remainder of the water coolant system under pressure. The pump is activated by a pressure switch 108 that is controlled by a hydraulic valve 109 associated with the shaker head movement, such that the water pump 106 is activated when the head is opened to release clamping pressure on a tree. The pressurized water from the pump 106 is fed through water lines 110 to a water metering valve 112 and a check valve 114 to the bulkhead 54. A water line 116 from the bulkhead then directs the water to a water manifold 120. In the preferred embodiment, the water manifold 120 is a pipe-like member that is placed within the air manifold 74, as depicted in FIG. 7. A coupling 122 joins a relatively narrow water spray tube 124 to the water manifold 120, and the tube 124 is disposed within the air nozzle 80 which projects from the air manifold 74. The tip 126 of the water tube 124 is disposed proximate the orifice of the nozzle 80, such that the water that projects from the tip 126 is forcefully blown outwardly by the pressurized air which emanates from the nozzle 80. It is therefore to be understood that each air nozzle 80 includes a water coolant tube 124 therewithin, such that water is sprayed through the same nozzle 80 from which the air emanates. The tips 126 of the water tubes 124 are thus positioned to spray a mist of coolant water upon the surface of the slings 78 of the shaker head 14 following each tree shaking operation of the device. The sprayed water serves to cool the outer surfaces of the slings, whereby the heat buildup within the slings is reduced, and the usable life of the pillow pads and slings is extended. The operations of the shaker device are thus prolonged.

A further improvement to the water cooling apparatus of the present invention is manifested with the addition of a water soluble liquid fungicide to the cooling water. The fungicide laden water is then sprayed upon the slings to cool the slings as described hereinabove. The fungicide within the water serves to disinfect the slings and prevent the transmission of fungus disease which may be borne upon the slings from tree to tree.

While the invention has been shown and described with reference to particular preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. An apparatus for cooling the shaker head of a tree harvester, comprising:
   a shaker head, said shaker head having opposing jaw members for gripping the trunk of a tree;
   pillow pad members, one such pillow pad member being removably held upon each said jaw member by a sling member;

a pillow pad cooling means including an air pressurizing means and a pressurized air delivery means, each said pillow pad having an air input means joined in pneumatic communication with said pressurized air delivery means, and an air exit means; whereby pressurized air may be pumped through said pillow pads to dissipate heat from within said pillow pads.

2. An apparatus as described in claim 1, further including a pressurized air outlet means being engaged in pneumatic communication with said pressurized air delivery means, and disposed to blow pressurized air upon said slings, whereby heat generated within said slings will be dissipated by said air.

3. An apparatus as described in claim 1 wherein said shaker head includes at least one drive belt for causing vibratory motion of said shaker head, and wherein a pressurized air outlet means is engaged in pneumatic communication with said pressurized air delivery means and disposed proximate portions of said belt to blow pressurized air upon said belt to dissipate heat buildup within said belt.

4. An apparatus as described in claim 1, including a pressurized liquid delivery means being engaged to said shaker head, said pressurized liquid delivery means including at least one liquid outlet means being disposed proximate said slings and functioning to spray cooling liquid upon the outer surface of said slings to dissipate heat buildup from said slings.

5. An apparatus for cooling the shaker head of a tree harvester, comprising:
   a shaker head, said shaker head having opposing jaw members for gripping the trunk of a tree;
   pillow pad members, one such pillow pad member being removably held upon each said jaw member by a sling member;
   a pressurized liquid delivery means being engaged to said shaker head, said pressurized liquid delivery means including at least one liquid outlet means being disposed proximate said slings and functioning to spray cooling liquid upon the outer surface of said slings to dissipate heat buildup from said slings.

6. An apparatus as described in claim 5 wherein said cooling liquid is water that includes a liquid fungicide dissolved therewithin.

7. An apparatus as described in claim 5 further including a pillow pad cooling means including an air pressurizing means and a pressurized air delivery means, each said pillow pad having an air input means joined in pneumatic communication with said pressurized air delivery means, and an air exit means; whereby pressurized air may be pumped through said pillow pads to dissipate heat from within said pillow pads;
   said apparatus further including a pressurized air outlet means being engaged in pneumatic communication with said pressurized air delivery means, and disposed to blow pressurized air upon said slings, whereby heat generated within said slings will be dissipated by said air.

8. An apparatus as described in claim 7 wherein said shaker head includes at least one drive belt for causing vibratory motion of said shaker head, and wherein a pressurized air outlet means is engaged in pneumatic communication with said pressurized air delivery means and disposed proximate portions of said belt to blow pressurized air upon said belt to dissipate heat buildup within said belt.

9. An apparatus for cooling the shaker head of a tree harvester, comprising:
   a shaker head, said shaker head having opposing jaw members for gripping the trunk of a tree;
   pillow pad members, one such pillow pad member being removably held upon each said jaw member by a sling member;
   a sling member cooling means including an air pressurizing means, a pressurized air delivery means, and a pressurized air outlet means being engaged in pneumatic communication with said pressurized air delivery means, said pressurized air outlet means being disposed to blow pressurized air upon said slings, whereby heat generated within said slings will be dissipated by said air.

10. An apparatus as described in claim 9 wherein said shaker head includes at least one drive belt for causing vibratory motion of said shaker head, and wherein a pressurized air outlet means is engaged in pneumatic communication with said pressurized air delivery means and disposed proximate portions of said belt to blow pressurized air upon said belt to dissipate heat buildup within said belt.

11. An apparatus for cooling the shaker head of a tree harvester, comprising:
   a shaker head, said shaker head having opposing jaw members for gripping the trunk of a tree;
   said shaker head including an air pressurizing means and a pressurized air delivery means;
   said shaker head further including at least one drive belt for causing vibratory motion of said shaker head, and wherein a pressurized air outlet means is engaged in pneumatic communication with said pressurized air delivery means and disposed proximate portions of said belt to blow pressurized air upon said belt to dissipate heat buildup within said belt.

12. An apparatus for cooling the shaker head of a tree harvester, comprising:
   a shaker head, said shaker head having opposing jaw members for gripping the trunk of a tree;
   pillow pad members, one such pillow pad member being removably held upon each said jaw member by a sling member;
   a pillow pad cooling means including an air pressurizing means and a pressurized air delivery means, each said pillow pad having an air input means joined in pneumatic communication with said pressurized air delivery means, and an air exit means; whereby pressurized air may be pumped through said pillow pads to dissipate heat from within said pillow pads;
   a first pressurized air outlet means being engaged in pneumatic communication with said pressurized air delivery means, and disposed to blow pressurized air upon said slings, whereby heat generated within said slings will be dissipated by said air;
   said shaker head including at least one drive belt for causing vibratory motion of said shaker head, and wherein a second pressurized air outlet means is engaged in pneumatic communication with said pressurized air delivery means and disposed proximate portions of said belt to blow pressurized air upon said belt to dissipate heat buildup within said belt; and
   a pressurized liquid delivery means being engaged to said shaker head, said pressurized liquid delivery means including at least one liquid outlet means being disposed proximate said slings and functioning to spray cooling liquid upon the outer surface of said slings to dissipate heat buildup from said slings;

said liquid outlet means being disposed proximate said first pressurized air outlet means, such that air from said first pressurized air outlet means will interact with said cooling liquid from said liquid outlet means to promote the spraying of said liquid upon said slings.

13. An apparatus as described in claim 12 wherein said liquid outlet means is disposed within said first pressurized air outlet means.

* * * * *